(12) United States Patent
Eslambolchi et al.

(10) Patent No.: US 6,650,293 B1
(45) Date of Patent: Nov. 18, 2003

(54) TECHNIQUE FOR PROVIDING CONVEYANCE LOCATING INFORMATION

(75) Inventors: Hossein Eslambolchi, Los Altos Hills, CA (US); Charles C. Giddens, Conyers, GA (US); John Sinclair Huffman, Conyers, GA (US); Harold Jeffrey Stewart, Alpharetta, GA (US)

(73) Assignee: AT&T Corp., New York, NY (US)

( * ) Notice: Subject to any disclaimer, the term of this patent is extended or adjusted under 35 U.S.C. 154(b) by 65 days.

(21) Appl. No.: 10/011,325

(22) Filed: Oct. 22, 2001

(51) Int. Cl.[7] .............................. G01S 5/04; G01S 5/14
(52) U.S. Cl. .............. 342/459; 342/357.13; 342/357.17
(58) Field of Search ................... 342/357.13, 357.17, 342/459, 357.14; 701/208, 213, 216

(56) References Cited

U.S. PATENT DOCUMENTS

| | | | |
|---|---|---|---|
| 5,576,973 A | * 11/1996 | Haddy | .............. 342/357.06 |
| 5,644,237 A | 7/1997 | Eslambolchi et al. | |
| 6,008,756 A | * 12/1999 | Boerhave et al. | ...... 342/357.13 |
| 6,084,542 A | * 7/2000 | Wright et al. | .......... 342/357.13 |
| 2002/0024464 A1 | * 2/2002 | Kovell et al. | .......... 342/357.14 |

FOREIGN PATENT DOCUMENTS

EP          000989353 A2 *   3/2000   ............. F17D/5/00

* cited by examiner

*Primary Examiner*—Gregory C. Issing

(57) ABSTRACT

To locate a buried conveyance (10), electromagnetic signaling information is collected at spaced intervals along the conveyance with the aid of a locating device (14). A processor (21) receives such information from the locating device (14) and then geographically orders the information in accordance with the geographic coordinates of the location at which it was obtained. Once geographically ordered, the information is then provided on a display (22) to provide a visual representation of the information as a function of the conveyance length.

10 Claims, 3 Drawing Sheets

TECHNIQUE FOR PROVIDING CONVEYANCE LOCATING INFORMATION

TECHNICAL FIELD

This invention relates to a technique for providing information gained from locating an underground conveyance by electromagnetic signaling.

BACKGROUND ART

Many utilities, such as AT&T, bury their pipes and cables ("utility conveyances") underground both for reasons of safety and esthetics. Underground burial often provides protection to such utility conveyances against weather and other sources of potential damage. Utilities that undertake burial of their conveyances usually make extensive efforts to plot the location of each buried conveyance on a map to facilitate its location in case of repair or replacement. While a map will indicate the general location of a buried conveyance, more precise location information often becomes necessary, particularly in urban environments. For that reason, most utilities that bury their conveyances underground typically rely on electromagnetic signaling techniques to precisely locate such conveyances.

U.S. Pat. No. 5,644,237, issued in the names of Hossein Eslambolchi and John Huffman, on Jul. 1, 1997, and assigned to AT&T, (incorporated by reference herein) discloses an electromagnetic signaling technique for locating a buried utility conveyance. A signal generator applies a locating signal and a confirmation signal to a metallic part of the conveyance. In the case of an optical fiber cable, the metallic part comprises either a metallic sheath or a copper trace wire within the cable. Using a signal detector, a technician detects both the locating signal and the confirmation signal radiated above ground to precisely locate the buried conveyance.

Often, a technician will locate separate portions of the conveyance at different locations along its length. Many of the signal detectors available for detecting conveyance locating signals have the capability of storing certain data collected during a locate operation. Such stored information data allows the technician to gain certain insights about the stored conveyance. Moreover, storing such information may prove useful for later analysis.

Traditionally, the stored conveyance location data, while useful, did not provide an overall representation of the conveyance. Moreover, the location data for each discrete portion of the conveyance provided no ability to facilitate readily combination with the location data associated with other discrete conveyance portions.

Thus, there is a need for a technique that provides location data representative of the entire conveyance.

BRIEF SUMMARY OF THE INVENTION

Briefly, in accordance with a preferred embodiment, the present invention provides location information for a buried conveyance. Initially, location data associated with each of a plurality of discrete conveyance portions is obtained, usually by a technician, who undertakes a locate operation at various spots along the conveyance. The location data for each discrete conveyance portion includes geographic coordinate information, typically obtained by a GPS unit, as to where the location information was obtained. Thereafter, the physical proximity of each discrete conveyance portion is established relative to the other discrete conveyance portions for which location information was obtained. Thereafter, the location data for the discrete conveyance portions is arranged in geographic sequence corresponding to the proximity of the discrete conveyance portions to each other. In this way, the location information associated with each discrete conveyance portion is arranged with the next closest discrete conveyance portion to provide a piece-wise set of location data for display. If desired, the piece-wise locating data can be smoothed using well-known curve filling techniques to yield a continuous function representative of the location data as a function of the conveyance length.

DETAILED DESCRIPTION

Figure 1:
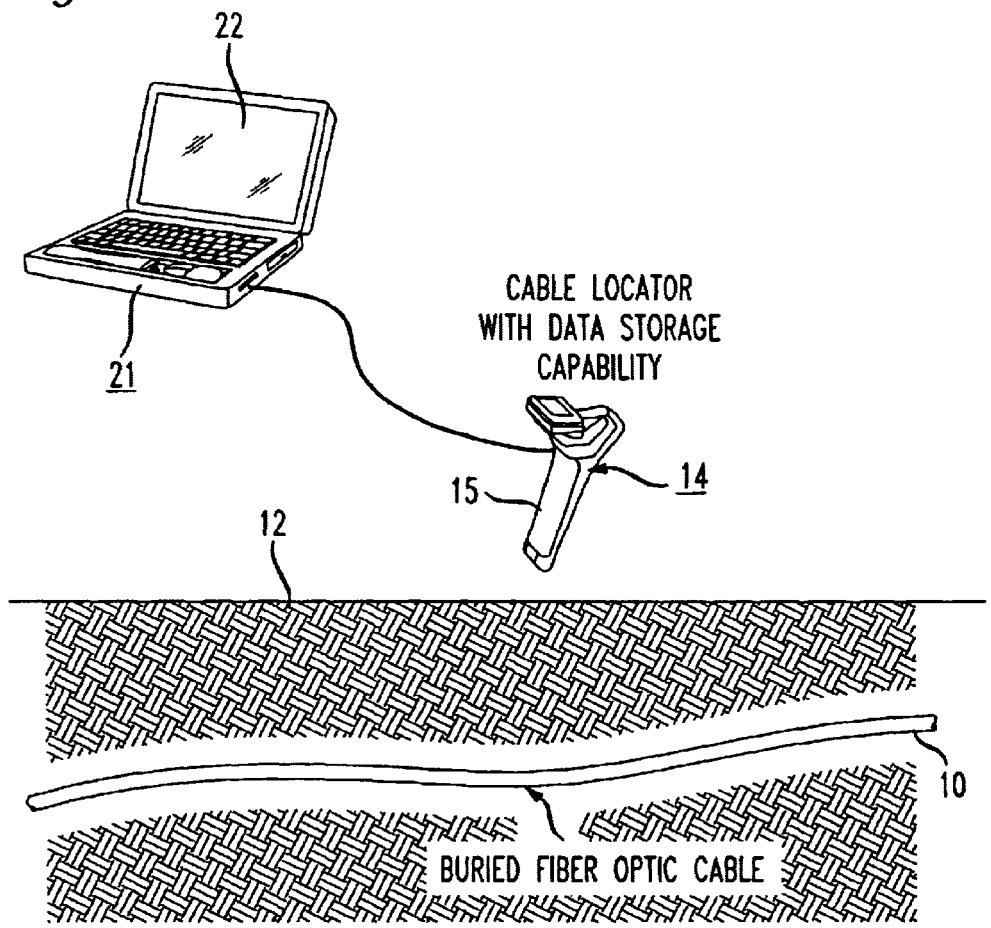
FIG. 1 depicts a schematic diagram illustrating the manner in which location data is obtained for discrete portions of a conveyance buried underground.

FIG. 1 depicts a utility conveyance 10, such as an optical fiber cable, buried below the surface of the earth 12. During burial of the conveyance 10, the entity (e.g., service provider) responsible for its maintenance will typically plot the location of the conveyance 10 on a map. However, such location information usually lacks the precision needed in the event of repair or replacement of the conveyance 10. For that reason, when conveyance repair or replacement becomes necessary, the service provider will typically dispatch a technician (not shown) to precisely locate the conveyance 10 via electromagnetic signaling.

To locate a conveyance using electromagnetic signaling, the technician will employ a locating device, 14, such as a PDL 4 locating device manufactured by Radiodetection, Inc, Mahwah, N.J., to detect at least a locating signal impressed on a metallic part of the conveyance. The metallic part of the conveyance may include the conductive sheath portion of a fiber optic cable or the entire conveyance itself in the case of a metal pipe. To achieve more precise location in accordance with the teachings of U.S. Pat. No. 5,644,237 (incorporated by reference herein), the metallic part of the conveyance 10 will carry both a locating signal as well as a confirmation signal. By using the detector 14 to detect both the locating and confirmation signals, a technician can locate the conveyance 10 with greater precision than by detecting the locate signal alone.

In practice, a technician seeking to locate a conveyance, such as the conveyance 10, will detect the locate signal at several different spots along the conveyance. Typically, locating device 14 has the capability of storing the locate information obtained at each spot along the conveyance 10. Heretofore, the stored locating data, while useful, could not readily be displayed to provide an overall representation of various locating attributes for the conveyance as a function of its length.

The present invention discloses a technique for providing an overall representation of various locating attributes for the conveyance as a function of its length. To that end, the locating device 14 includes a Global Position Satellite location unit 15 that determines the exact location of the locating device 14 using GPS measurements (within the error limits associated with such measurements). Each time a technician performs a location measurement on the conveyance 10, the GPS locating unit 15 determines the geographic coordinates of the locating device 14 for storage along with other locating information determined by the locating device.

Figure 2:
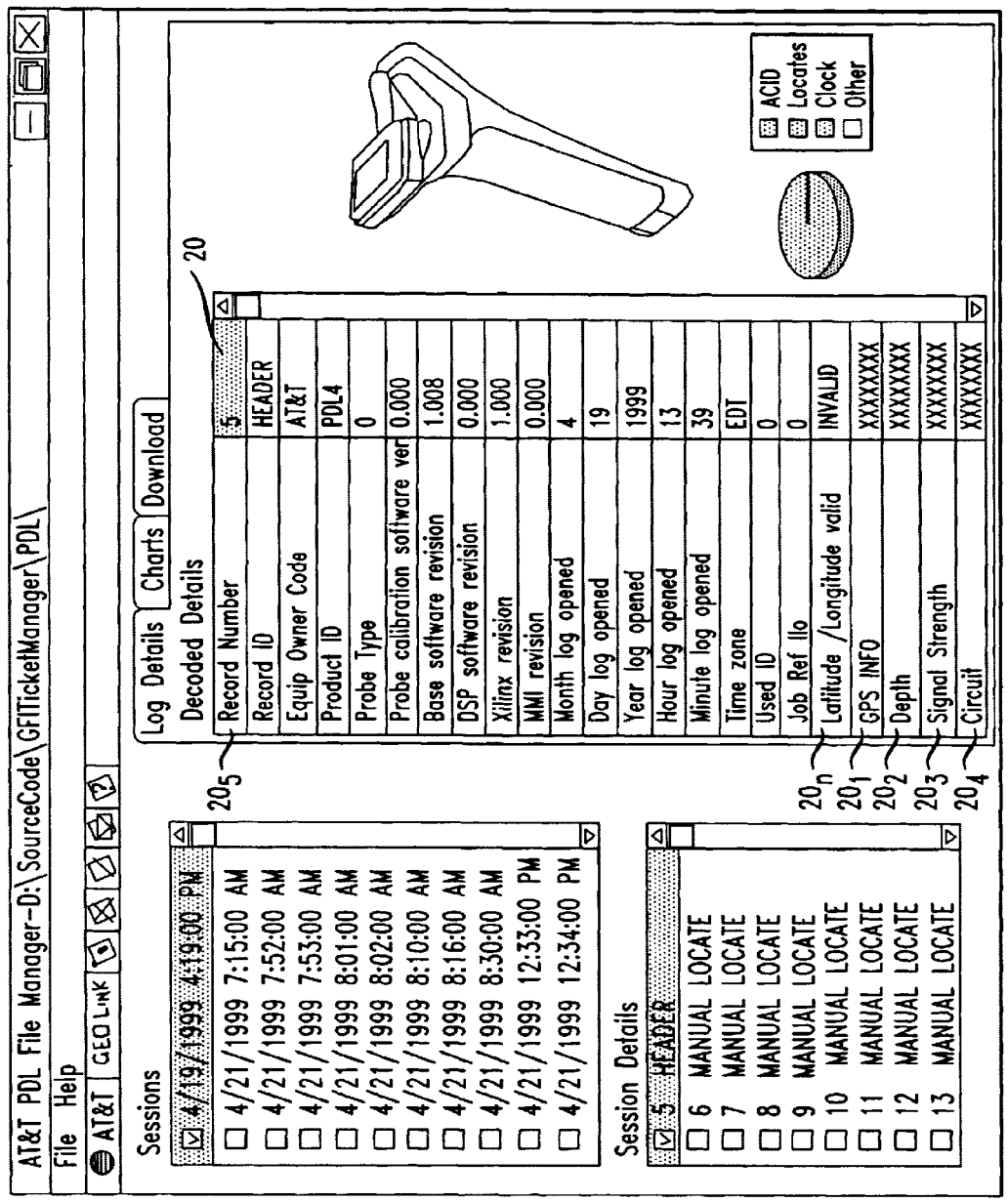
FIG. 2 shows a graphical representation of a data record obtained during a locate operation performed on a discrete portion of the conveyance of FIG. 1.

FIG. 2 shows a data record 20 stored by the locating device 14 for a discrete locate operation performed by the technician at a particular spot along the conveyance 10 of FIG. 1. The data record 20 for each discrete locate operation performed by the technician includes a plurality of data elements $20_1$–$20_n$ (where n is a integer) each indicative of a particular attribute associated with the locate operation. Among the attributes included within the data record 20 is the GPS coordinates, represented by attribute $20_1$, the conveyance depth, represented by attribute $20_2$, the strength of the locate signal, represented by attribute $20_3$ and the electrical current carried by the conveyance 10, represented by attribute $20_4$. Others of the attributes $20_5$–$20_n$, may include the time and date of the locate operation, the owner of the conveyance, as well as information associated with the locating device 14.

Figure 3:
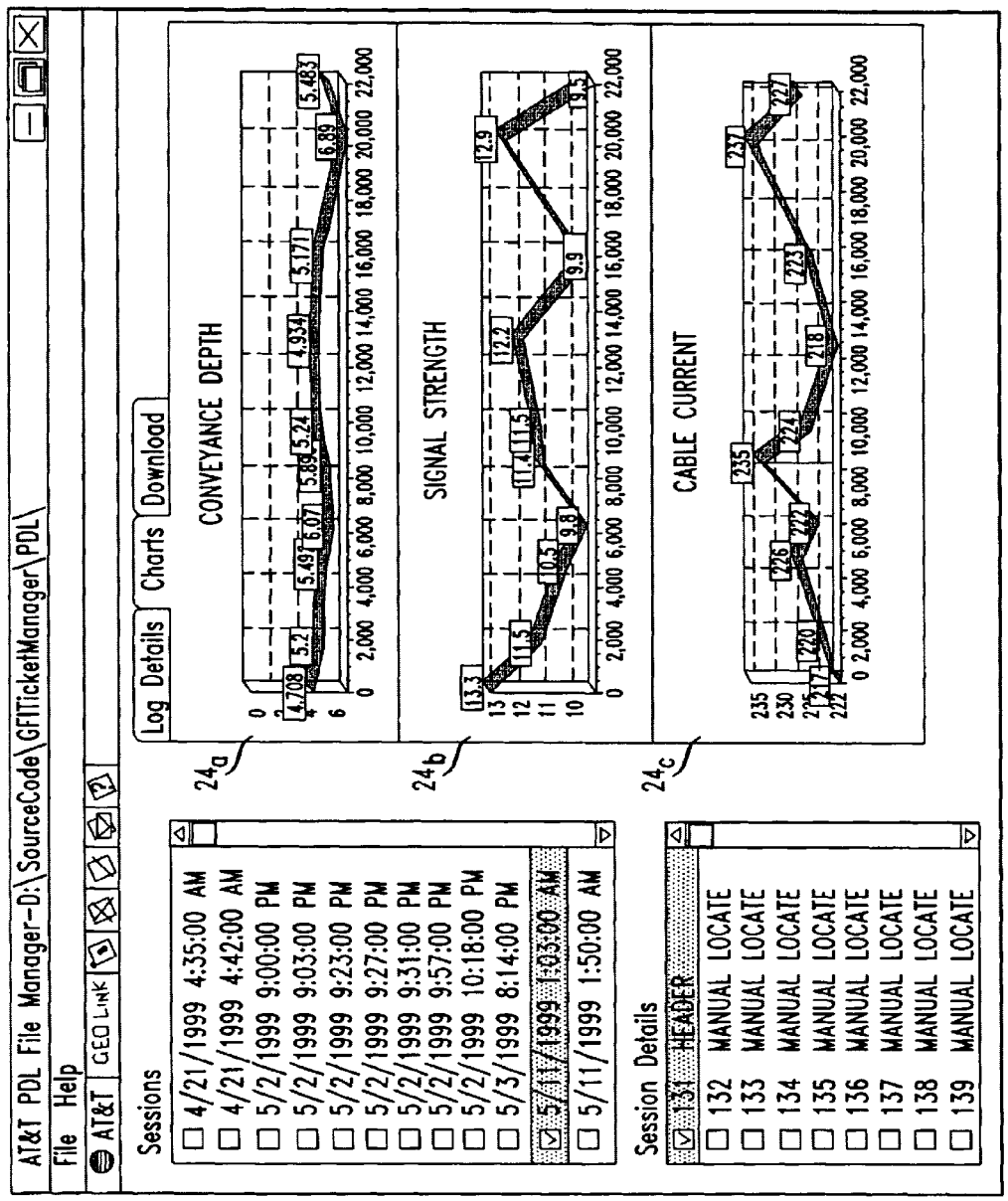
FIG. 3 shows a chart of locating data displayed in accordance with the teachings of the invention.

The locating device 14 of FIG. 1 will download each data record 30 of FIG. 2 to a data processor 21 shown in FIG. 1 that typically takes the form of a personal computer having an associated display 22 that may be integral with the computer, as in the case of a portable lap top, or separate in the case of a desk top. The processor 21 combines the data records 30 in geographic sequence to yield an overall representation of the location of conveyance for display on the display 22. For example, the processor 21 of FIG. 1 may combine the data records in geographic sequence to provide a graph of the conveyance depth as a function of length, as represented by the chart 24a of FIG. 3, while simultaneously providing chart 24b that depicts the locating signal strength as a function of conveyance length, and chart 24c depicting the conveyance current as a function of length. The charts 24a–24c of FIG. 3 are merely exemplary and others of the attributes $20_1$–$20_n$ of FIG. 2 that typically vary as a function of length could also be displayed in place or, or in addition to the charts 24a–24c.

In processing the information contained in the data records 30 to provide the display(s) on the display 22 of FIG. 1, the processor 21 of FIG. 1 will first determine the geographic proximity of conveyance portion corresponding to the particular data record to enable the processor to order (i.e., arrange) the data records in geographic sequence. In other words, the processor 21 will geographically sequence the data records 30 such that the data record obtained during a locate operation associated with a particular discrete conveyance portion will follow the data record associate with the next proximate conveyance portion.

Depending on the physical distance between discrete conveyance portions on which locate operations have been performed, the displayed data may appear somewhat disjointed. The processor 21 could smooth such piece-wise data using well-known curve-fitting techniques to provide a less disjointed display, thereby providing overall representation of the particular location attribute as a function of conveyance distance.

The foregoing discloses a technique for providing locating information associated with a buried conveyance, and more particularly, for providing locating information as a function of the conveyance length.

The above-described embodiments merely illustrate the principles of the invention. Those skilled in the art may make various modifications and changes that will embody the principles of the invention and fall within the spirit and scope thereof.

What is claimed is:

1. A method for providing locating information for a buried conveyance, comprising the steps of:

receiving locating information associated with each of a plurality of discrete portions of the conveyance, said locating information for each discrete portion including geographic coordinate data indicative of where such locating information was obtained;

establishing a physical proximity for each discrete portion of the conveyance relative to the other discrete portions based on the geographic coordinate data;

altering an arrangement of the locating information for the discrete portions of the conveyance to be in sequence corresponding to the proximity of the discrete portions to each other; and displaying the combined locating information to provide an overall representation of the conveyance.

2. The method according to claim 1 wherein the arranged locating information is stored for subsequent retrieval.

3. The method according to claim 1 wherein the location data includes conveyance depth information.

4. The method according to claim 1 wherein the location data includes locating signal strength information.

5. The method according to claim 1 wherein the location data includes conveyance current information.

6. The method of claim 1 wherein the geographic coordinate data is obtained from a Global Positioning Satellite measurement.

7. The method of claim 1 wherein the arranged locating data is smoothed before display.

8. A method for providing locating information for a buried conveyance, comprising the steps of:

receiving locating information associated with each of a plurality of discrete portions of the conveyance, said locating information for each discrete portion including Global Positioning Satellite data indicative of the geographic coordinates where such locating information was obtained, the locating information including at least information indicative of at least one of: conveyance depth, locating signal strength; and conveyance current;

establishing a physical proximity for each discrete portion of the conveyance relative to the other discrete portions based on the geographic coordinate data;

altering an arrangement of the locating information for the discrete portions of the conveyance to be in sequence corresponding to the proximity of the discrete portions to each other; and displaying the combined locating information to provide an overall representation of the conveyance.

9. The method according claim 8 wherein the arranged locating information is stored for subsequent retrieval.

10. The method of claim 8 wherein the arranged location data is smoothed before display.

* * * * *